United States Patent [19]
Nikaido

[11] Patent Number: 4,678,951
[45] Date of Patent: Jul. 7, 1987

[54] LINEAR MOTOR

[75] Inventor: Akira Nikaido, Tokyo, Japan

[73] Assignee: Citizen Watch Co., Ltd., Tokyo, Japan

[21] Appl. No.: 675,822

[22] Filed: Nov. 28, 1984

[30] Foreign Application Priority Data

Nov. 29, 1983 [JP] Japan ............................... 58-224758

[51] Int. Cl.⁴ ............................................. H02K 41/00
[52] U.S. Cl. ........................................ 310/13; 318/135
[58] Field of Search ................................... 310/12–14, 310/27; 318/135

[56] References Cited

U.S. PATENT DOCUMENTS

| | | | |
|---|---|---|---|
| 3,505,544 | 4/1970 | Helms | 310/13 |
| 3,760,206 | 9/1973 | Hertrich | 310/13 |
| 4,247,794 | 1/1981 | Jooss et al. | 310/13 |
| 4,318,038 | 3/1982 | Munehiro | 318/135 |
| 4,427,905 | 1/1984 | Sutton | 310/13 |

Primary Examiner—Donovan F. Duggan
Attorney, Agent, or Firm—Koda and Androlia

[57] ABSTRACT

A linear motor driving a carriage used in a magnetic memory. The motor includes a rotor portion having a hollow sleeve like member extending outwardly from the carriage at the side opposite to the magnetic head mounting portion of the carriage and a driving coil wound around the forward end of the hollow member; and a stator portion on the frame body of the magnetic memory and having a central yoke disposed within the hollow member along the direction of carriage movement, a U-shaped yoke surrounding the driving coil with the legs thereof being parallel to the central yoke, and a pair of permanent magnets mounted on the opposed faces of the legs of the U-shaped yoke. By means of this linear motor, the magnetic memory can be reduced in dimension.

4 Claims, 3 Drawing Figures

F I G. 2
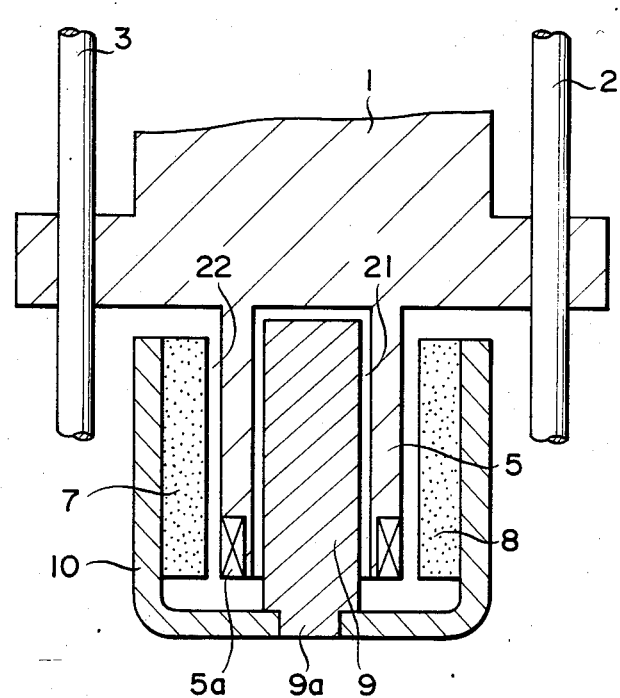

LINEAR MOTOR

BACKGROUND OF THE INVENTION

1. Field of the Invention

The present invention relates to a linear motor for driving a carriage, particularly, which is adapted to position a magnetic head in a magnetic memory.

2. Prior Art

In general, magnetic memories (floppy-disc drives and hard-disc drives) have utilized a carriage for moving a magnetic head to any place on a magnetic storing medium whereat data is written to and read out of the magnetic storing medium.

High-speed access, reduction in dimension and high-compactness of track are recently required for the magnetic memories.

To this end, a linear motor has been proposed as a drive for a carriage which serves to move a magnetic head.

In the conventional memories, however, the linear motor has been designed separately from the carriage. There is thus a disadvantage that the memories cannot be reduced in dimension. Therefore, such a linear motor has been adopted exclusively in large-sized memories rather than small-sized memories, for example, 3.5 inch floppy disc drives.

SUMMARY OF THE INVENTION

In view of the above problems, it is an object of the present invention to provide a carriage driving linear motor which is formed integrally with a carriage so that a magnetic memory utilizing such a linear motor can be reduced in dimension and function with high-performance.

To accomplish this object, the present invention provides a linear motor for driving a carriage used in a magnetic memory, the motor comprising rotor means including a hollow sleeve-like member extending from the carriage at the side opposite to the magnetic head mounting portion of the carriage and a driving coil wound around the forward end of the hollow member; and stator means on the frame body of the magnetic memory and including a central yoke disposed inside of the hollow member along the direction of carriage movement, a U-shaped yoke surrounding the driving coil with the opposite legs being parallel to the central yoke, and a pair of permanent magnets mounted on the opposed faces of the legs of the U-shaped yoke.

Further, the carriage driving linear motor constructed in accordance with the present invention is characterized in that the carriage is formed of a synthetic resin crystallized by the radiation of α-ray.

BRIEF DESCRIPTION OF THE DRAWINGS

FIG. 2 is a cross-sectional view showing the major section of the linear motor shown in FIG. 1.

DETAILED DESCRIPTION OF THE INVENTION

A preferred embodiment of the present invention will now be described with reference to the drawings.

Figure 1:
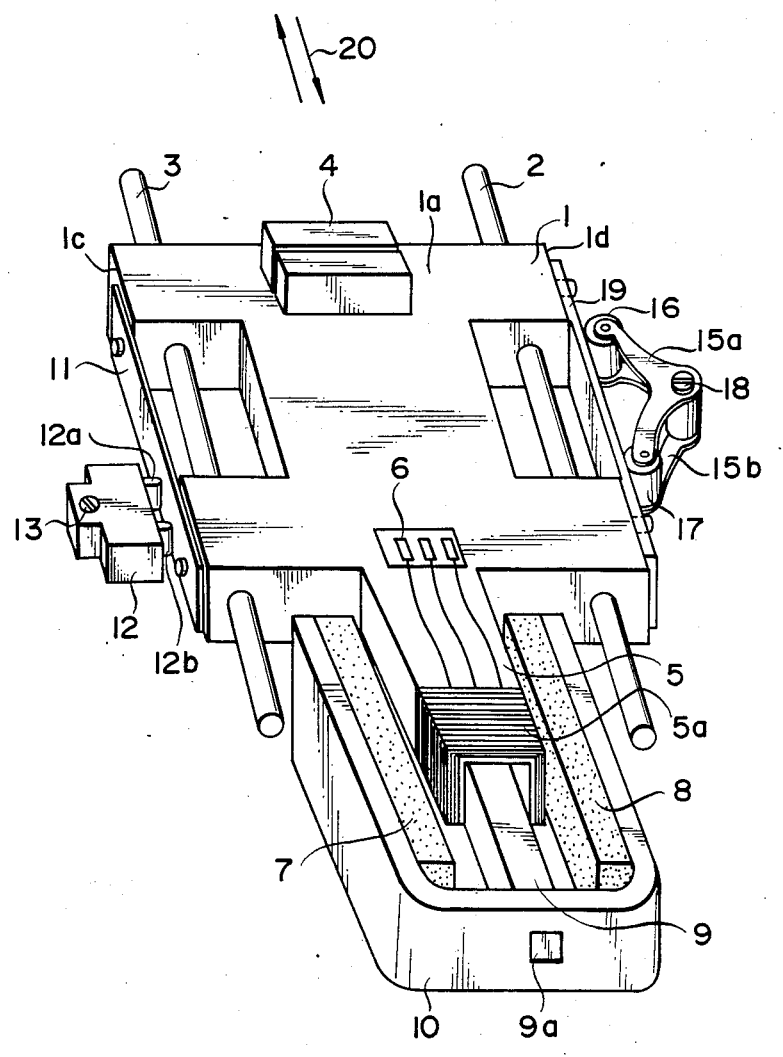
FIG. 1 is a schemaltic and perspective view of a carriage driving linear motor according to the present invention.

FIG. 1 shows a preferred embodiment of the present invention in which a carriage 1 is supported on the frame of a magnetic memory through a pair of guide bars 2 and 3 such that the carriage can slidably be moved in the direction of arrow 20. The carriage 1 includes a top face 1a on which a magnetic head 4 is mounted adjacent to the end of the carriage 1, that is, forwardly in the direction of movement 20.

The carriage 1 is adapted to move perpendicular to the tracks (S) of a magnetic medium, for example, a disc. Thus, the end 4 also is slidably moved, with the carriage 1, in the direction perpendicular to the trackss (S) of the disc so that data will be written to and read out of the disc.

The present invention is characterized by the fact that a linear motor is utilized as a drive for the carriage 1 and can be formed integrally with the carriage. This leads to reduction of dimension and to improvement of performance.

To this end, the present invention provides a sleeve-like coil frame 5 formed integrally on the carriage 1 and extending from the carriage in the direction opposite to the carriage portion on which the magnetic head is mounted. In the illustrated embodiment, the coil frame 5 is a sleeve of square cross-section which extends forwardly from the forward end face of the carriage 1 in the direction of movement 20. A drive coil 5a used to drive the linear motor is wound on the forward end portion of the coil frame 5. The drive coil 5a is connected with coil terminals 6 on the top surface 1a of the carriage 1.

FIG. 2 shows the construction of the linear motor section in which a central yoke 9 having a rectangular cross-section is disposed within the coil frame 5 with an air gap 21 being formed therebetween and extends in the direction of movement 20. A U-shaped yoke 10 is located outside of the drive coil 5a such that the latter is interposed between the opposite faces of the legs of the U-shaped yoke 10. The central yoke 9 is cramped on the central portion 9a of the U-shaped yoke 10. Thus, the central and U-shaped yokes 9 and 10 are mechanically and magnetically connected integrally with each other. The U-shaped yoke 10 includes a pair of permanent magnets 7 and 8 mounted on the opposed faces of the legs of the U-shaped yoke 10. These magnets 7 and 8 are opposed to the drive coils 5a through an air gap 22.

The U-shaped yoke 10 is fixedly mounted on the frame body (not shown).

When the drive coil 5a is excited, an electromagnetic force is produced between the coil 5a and the respective magnets 7 and 8, and this electromagnetic force provides a driving force for the carriage 1. Thus, the carriage 1 is moved by this driving force in the direction of movement 20 to any position wherein the magnetic head 4 is properly positioned.

Figure 3:
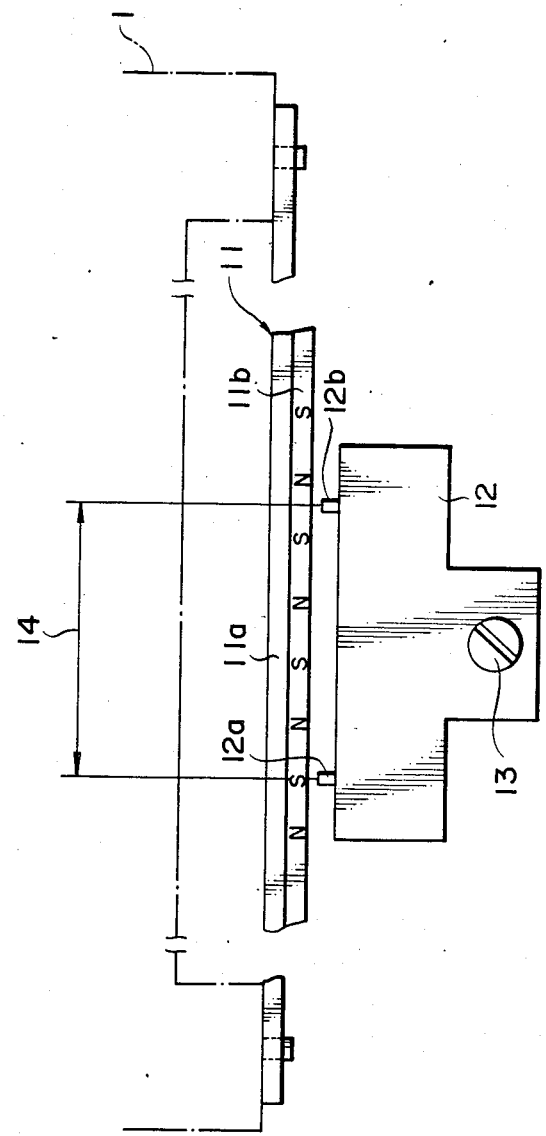
FIG. 3 illustrates a position sensor.

To attain such a positioning operation, the apparatus according to the present invention employs a position sensor on the carriage 1 at one side 1c in the direction of movement 20. FIG. 3 shows the details of such a position sensor as used in the illustrated embodiment.

More particularly, the side 1c of the carriage 1 includes a magnetic scale 11 mounted thereon. The magnetic scale includes a base plate 11a made of glass or metal and a magnetic film 11b formed on the base plate 11a. The magnetic film 11b is magnetized to be compatible with the track pitch of the magnetic storing medium used, for example, a pitch of 10 to 50 μm.

A sensor chip 12 is disposed opposed to the magnetic film 11b and fixedly mounted on the frame body through a machine screw 13. The sensor chip 12 includes a pair of MR(magnetic reluctance element) heads 12a and 12b which are mounted thereon at the side opposed to the magnetic film 11b and spaced away from each other by such a distance 14 that the heads 12a and 12b will be placed out of phase by 90 degrees.

In such an arrangement, when the magnetic scale 11 is read by the MR heads 12a and 12b, the position of the magnetic head 4 can be detected and then exactly positioned in place.

Where the positioning is generally effected with high accuracy in the high-speed access mode, it is required to minimize a play in the carriage 1 in the direction of movement 20 to provided an increased rigidity and an reduced time constant in the driving coil 5a.

In accordance with the present invention, the opposite side 1d of the carriage 1 in the direction of movement 20 includes a guide plate 19 for eliminating any play in the direction of movement 20. The guide plate 19 is engaged under pressure by rollers 16 and 17 which are respectively held by a pair of spring arms 15a and 15b which in turn are fixedly mounted on the frame body (not shown) through a machine screw 18.

By properly biasing the carriage 1 by means of the rollers 16 and 17 in the direction perpendicularly to the direction of movement 20, the play in the direction of movement 20 can be minimized to improve the carriage 1 with respect to its linear motion in the direction of movement 20 so that the magnetic head 4 can more accurately be positioned in place.

Furthermore, in order to minimize the frictional loss, it is preferable that the carriage 1 is formed of a synthetic resin. However, such a synthetic resin tends to decrease the rigidity of the carriage 1. In addition to the severe selection of the material, the selected synthetic resin material may be crystallized by the radiation of α-ray, which has recently been developed, to provide substantially the same rigidity as those of metallic materials. As a result, the carriage made of such a synthetic resin may have less frictional loss and sufficient rigidity.

The time constant in the driving coil 5a depends on the construction of a magnetic circuit used. When the U-shaped yoke 10 is used to provide an open magnetic circuit as in the present invention, the time constant is improved so that it can be set at 1 msec or less.

Furthermore, the magnetic scale and sensor can be shielded in the conventional manner.

In accordance with the present invention, the carriage and linear motor can be formed integrally with each other, and the magnetic memory using them can be reduced in dimension.

I claim:

1. A linear motor for driving a carriage used in a magnetic memory, said linear motor comprising a linearly movable member including a coil frame of a hollow sleeve configuration which is formed integrally on the carriage which is movably supported by the frame body of the magnetic memory, said coil frame further being provided at a side opposite to a magnetic head mounting portion of said carriage, and a driving coil wound around said coil frame; stator means on the frame body of said magnetic memory and including a central yoke disposed within said coil frame along the direction of carriage movement, a U-shaped yoke surrounding said driving coil with the opposite legs thereof being parallel to said central yoke, and a pair of permanent magnets; position sensor means including a magnetic scale provided on one side of said carriage in the direction of carriage movement, and a sensor means provided on the frame body of said magnetic memory and having a pair of magnetic reluctance heads located on said sensor means at the side opposed to said magnetic scale; guide means including a guide plate provided on said carriage at an opposite side from said magnetic scale in the direction of carriage movement and biasing means on the frame body of the said magnetic memory for biasing said guide plate in a direction perpencicular to the direction of movement of said carriage.

2. A linear motor as defined in claim 1 wherein said carriage is made from a synthetic resin which is crystallizable by α radiation.

3. A linear motor as defined in claim 1 wherein said magnetic scale has a track pitch substantially the same as a track pitch of said magnetic storing medium.

4. A linear motor as defined in claim 3 wherein said pair of magnetic reluctance heads are provided out of phase by 90 degrees.

* * * * *